US005907480A

United States Patent [19]

Salonen

[11] Patent Number: 5,907,480

[45] Date of Patent: May 25, 1999

[54] METHOD FOR REDUCING POWER CONSUMPTION IN A DISPLAY UNIT

[75] Inventor: Vesa Ilari Salonen, Salo, Finland

[73] Assignee: Nokia Technology GmbH, Pforzheim, Germany

[21] Appl. No.: 08/959,562

[22] Filed: Oct. 28, 1997

[30] Foreign Application Priority Data

Oct. 29, 1996 [FI] Finland ..................................... 964356

[51] Int. Cl.[6] ........................... H02M 3/335; H02M 3/24; H02H 7/122

[52] U.S. Cl. .................................. 363/21; 363/56; 363/97

[58] Field of Search .................................. 363/20, 21, 78, 363/97, 131, 55, 56, 95

[56] References Cited

U.S. PATENT DOCUMENTS 5,282,122 1/1994 Summer ..................................... 363/21
5,555,167 9/1996 Fujihashi ................................... 363/49
5,675,480 10/1997 Stanford .................................... 363/21
5,675,485 10/1997 Seong ......................................... 363/21

*Primary Examiner*—Peter S. Wong
*Assistant Examiner*—Bao Q. Vu
*Attorney, Agent, or Firm*—Ware, Fressola, Van Der Sluys & Adolphson LLP

[57] ABSTRACT

The invention relates to reducing the power consumption of a display unit. In a system according to the invention, the power source (2) is switched off in the OFF mode, and only the processor control circuit (4) is in operation, in order to detect the occurrence of control signals (8). If the control circuit (4) detects a control signal, it switches an operating voltage to the microprocessor (6) from the energy supply (12) of the secondary circuit. Then the microprocessor starts the power source (2) and examines the state of the control signals (8). If the state of the control signals requires starting the system, the processor (6) starts switching the whole system into operation. The control circuit (4) can be very simple, and thus its power consumption is also very low. The power input of the control circuit can be implemented by means of passive components (22), such as large resistors, directly from the primary side.

9 Claims, 2 Drawing Sheets

METHOD FOR REDUCING POWER CONSUMPTION IN A DISPLAY UNIT

TECHNICAL FIELD

Figure 1:
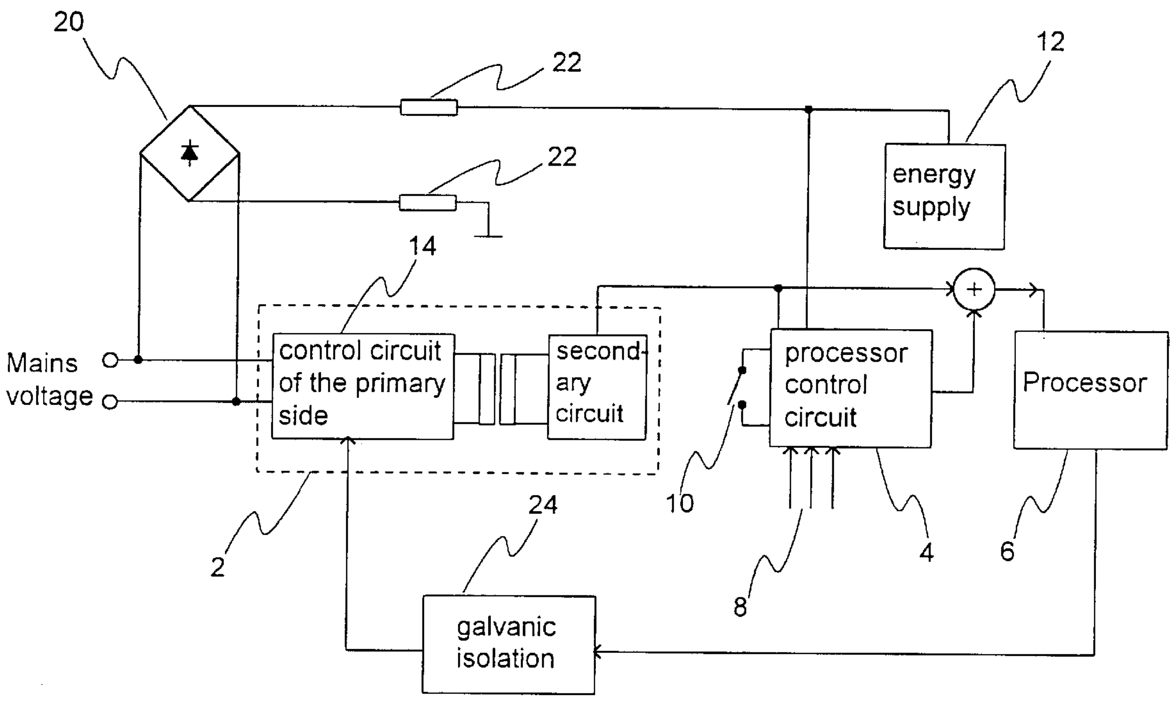

The invention relates to the reduction of power consumption in a display unit.

BACKGROUND OF THE INVENTION

Often the display is normally switched on in the morning and switched off in the evening after work. This means that the display is on throughout the day, consuming energy, although it may be in efficient use only for a short period of the day. At some places of work, the display is not switched off at all between working days. This being the case, many different solutions have been developed to reduce the power consumption of display units.

One known solution, which is more aimed at increasing the lifetime of the cathode-ray tube than energy saving, is to use a program in the computer system which blanks the screen when the system has not been used for a certain period of time. The main purpose of this function is to prevent figures that remain unchanged for a long period of time from burning into the fluorescent material of the cathode-ray tube. At its simplest, a function like this just shuts off the video signal from the display driver.

A substantial reduction in energy consumption can be achieved with a display structure in which the display is turned off after a certain period from the moment when the system was last used. This can be implemented, for example, with a circuit which detects the absence of a video signal and cuts power input to the most power-consuming parts of the display unit for the time when the signal is absent. With a structure of this kind, it is possible to reduce power consumption in the energy saving mode to approximately 5–8 W.

The Video Electronics Standards Association (VESA) has specified the Display Power Management Signalling system (DPMS, which is based on the monitor synchronizing signals). In the DPMS system, the operation of the display is divided into four different modes:

- the ON mode, which corresponds to the normal operation of the display;
- the Stand-By mode, in which the display screen is blanked, for example, and thus a small reduction in power consumption is achieved;
- the Suspend mode, in which a substantial part of the display operations are switched off, and
- the OFF mode, in which nearly all display operations are switched off to the extent that it is possible.

Power consumption is the lowest in the Suspend and OFF modes.

In the DPMS system, the desired mode of operation of the display unit is implemented by means of vertical and horizontal synchronizing pulses. The display must be able to interpret the desired mode of operation from the levels of the vertical and horizontal synchronizing pulses and be able to change to the level of operation specified by the synchronizing pulses. The states of the synchronizing pulses that correspond to various modes of operation are given in the table below.

| Power saving mode | Horizontal synchronizing pulses | Vertical synchronizing pulses |
|---|---|---|
| ON mode | Yes | Yes |
| Stand-By mode | No | Yes |
| Suspend mode | Yes | No |
| OFF mode | No | No |

In the table, "Yes" means that the frequency and pulse ratio of the incoming signal are over the threshold value defined in the DPMS system. Correspondingly, "No" means that the frequency and pulse ratio of the incoming signal are below the threshold value.

In a solution according to the DPMS system, the circuit that interprets the synchronizing signals must be able to measure the frequency and pulse ratio of the synchronizing pulses, when required. The solution must also be capable of verifying the current situation in order to avoid errors in a situation in which the display driver changes the resolution, for example. In addition, energy is needed for interpreting the synchronizing pulses, and due to the characteristics of the technique used, this energy cannot be taken from the display driver. A common solution for interpreting the synchronizing pulses and controlling the display is to use the microprocessor of the display.

One solution that is commonly used with a DPMS system is the so-called Soft Power switch. In this case, the equipment does not have an actual main power switch for switching off the device, but it has been replaced by a switch connected to the processor. By this switch, the device can be switched to the OFF mode regardless of the state of the synchronizing signals. To the user, the OFF mode looks like the device had been switched off from the main power switch.

There are now three types of structures available for power input to the secondary circuit of the power source during the extreme power saving mode, namely the OFF mode:

- power is fed from the mains supply to the secondary circuit of the power source by means of a main power source,
- power input from the mains to the secondary circuit of the power source by means of passive components, such as capacitors, and
- use of a separate power source.

In the first modification of the solution using a main power source, the secondary circuit of the power source has switching means, by which power-consuming parts of the system are switched off. The switching off can be carried out by cutting either the control signals of the parts or the operating voltages of the parts. In the suspend mode, power-intensive blocks are switched off. In the OFF mode, all other blocks except the processor or a corresponding circuit that interprets the synchronizing signals and controls the device are switched off. In a solution like this, the power source of the device operates continuously and produces continuous, stabilized operating voltages for the secondary circuit. This solution has the advantage of simple construction, but the efficiency of the power source remains low. In addition, a large number of switching means are required, if there is a large number of operating voltages in the system.

In another modification of the solution using a main power source, the operating voltages of the secondary circuit are stabilized in the OFF mode to a substantially lower level than in normal operation, whereby the operation of circuits loading the secondary circuit is prevented, and the power consumption of the circuits falls. In practice, this generally takes place so that a high, stabilized operating voltage of a secondary circuit, such as 150 volts, from which other operating voltages of the secondary circuit are formed, is stabilized to a level of approx. 8 volts. The operating voltage required by the processor is taken from the lowered operating voltage (for example, +5 V) by means of a regulator. In this modification, the stabilization of voltages to a lower level than normally corresponds to the function of the switches in the first modification. In addition to the means for lowering the voltage, a switch is needed to switch the lowered secondary voltage as the operating voltage of the processor during the power saving mode. This solution still has the advantage of being simple, and the efficiency of the power source is also somewhat improved, because the voltage amplitudes generated in the power source are smaller compared to the first solution. The complexity of the switching is not dependent on the number of operating voltages, because all the operating voltages are reduced at the same time.

In a third modification using a main power source, the operation of the power source is not continuous, but energy is fed to the secondary circuit in pulses. Thus the efficiency of the power source is still somewhat improved. In a system like this, the operating voltages of the secondary are not stable during the power saving mode, but they include oscillation at the frequency of the pulses. However, the processor receives a sufficient operating voltage to continue its operation without interruption.

Another basic solution uses passive components, such as capacitors, for transmitting power from the mains to the secondary circuit. The capacitive current of the capacitors is rectified and filtered into a direct current in the secondary circuit. In order that the power thus obtained would be sufficient for ordinary processors, the capacitance of the capacitors must be high, whereby their physical size and costs also become high.

In systems where a separate power source is used, the second power source is used when the main power supply is switched off. The separate power source is optimized for low powers, and it normally only feeds the power to the processor. The advantages of this system include reliable operation and good efficiency of the power source. However, the need of two power sources is a disadvantage, which increases the component costs.

SUMMARY OF THE INVENTION

It is an objective of the invention to achieve a power saving method in the OFF mode, which is more efficient than the prior art. Furthermore, the invention aims at implementing a simple power saving method in which the number of extra components required is as small as possible.

The objectives are achieved by completely switching off the power source of the display in the OFF mode, whereby the processor that controls the operation of the system is also switched off. For the purpose of monitoring the control signals of the display, a simple processor control circuit is added to the system, with the purpose of starting the system processor when the control circuit detects signals on the control signal lines of the display or when the user presses the power switch of the device. After starting, the processor starts the power source of the system, examines the state of the control signals and turns the system to the mode required by the control signals of the system.

In the system according to the invention, the power source is switched off when in the OFF mode, whereby the operating voltage of the microprocessor controlling the operation of the system is at zero. Only the control circuit of the processor is on, for detecting a control signal and for monitoring the state of the power switch. If the control circuit detects a control signal, it switches an operating voltage for the microprocessor from the energy supply of the secondary circuit. Then the microprocessor starts the power source and examines the state of the control signals. If the state of the control signals requires that the system be started, the processor starts switching the whole system into operation. If the control signals do not require starting the system, the processor interprets the signal detected by the control circuit as an interfering signal and turns the power source off. The operation of the control circuit is very simple, whereby it can be implemented by a simple circuit which consumes as little power as possible. Due to the low power consumption, power input to the control circuit can be implemented by passive components, such as large resistors, directly from the primary side.

A method according to the invention is characterized in that in the power saving mode, the processor controlling the operation of the display is started when a change takes place in the state of the power switch or one of the said control signals.

A system according to the invention is also characterized in that the system comprises a control circuit for monitoring said control signals and power switch in the power saving mode, and in that said control circuit is arranged to switch on the system processor when the state of said control signals or the power switch changes.

BRIEF DESCRIPTION OF THE INVENTION

Figure 2:
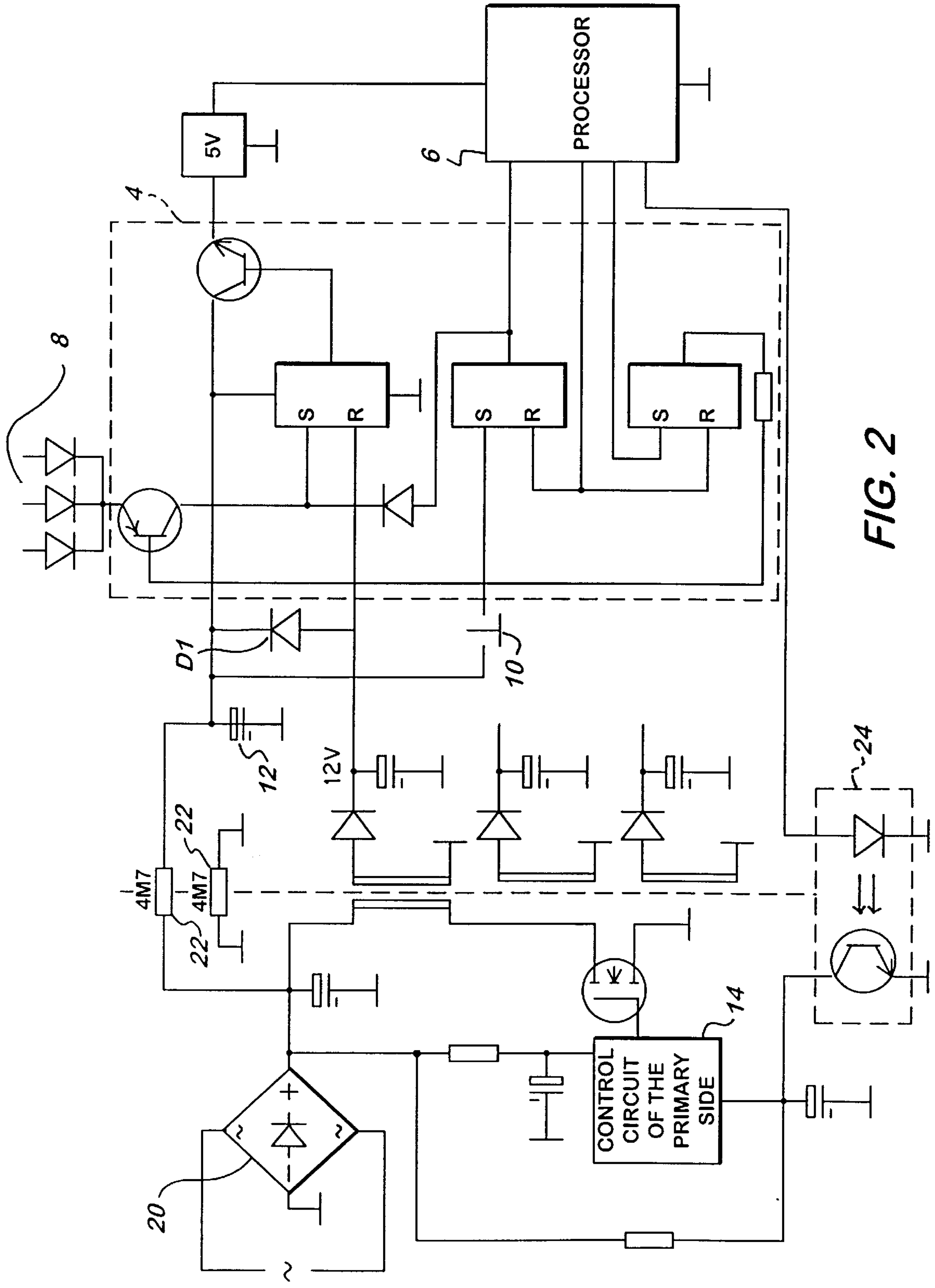

In the following, the invention will be described in more detail with reference to the preferred embodiments shown by way of example and the accompanying drawings, in which FIG. 1 shows a block diagram of a solution according to the invention, and FIG. 2 shows one preferred embodiment of the invention.

BEST MODE FOR CARRYING OUT THE INVENTION

The same reference numbers and markings are used in the figures for equivalent parts.

In the system according to the invention, the power source 2 of the display is switched off for the duration of the power saving mode. In the power saving mode, the control circuit 4 of the processor is substantially the only block of the display which is in operation. The processor control circuit 4 monitors the state oaf the display control signals 8 and the power switch 10. If the control circuit 4 detects a change in the state of the control signals 8 or the power switch 10, the control circuit 4 starts a processor 6, which controls the operation of the display.

In order to produce the energy required for starting the processor 6, the system also comprises an energy supply 12.

As one of the first operations after starting, the processor 6 starts the power source 2. The starting signal can advantageously be transmitted by means of a galvanic isolator 24, such as an opto-isolator 24, to the control circuit 14 of the primary side of the power source 2, whereby the control circuit, when it has received the starting signal, starts the power source 2. The capacity of the energy supply 12 is preferably optimized to such a size that the energy of the energy supply is sufficient to start the processor and to give the starting signal to the power source. The energy supply 12 is preferably arranged to recharge as soon as the power source starts.

When the power source has started, the processor 6 examines the state of the control signals 8 and the power switch 10. If the state of these is such that the display should start, the processor starts the other blocks of the display according to the state of the control signals and the power switch. Otherwise, the processor interprets the change in the state of the signals detected by the control circuit 4 as an interfering signal and switches off the power source 2.

In a method according to the invention, it is possible for the processor to also carry out other functions besides those mentioned above in the on and off switching phases. For example, before switching off the processor can save the information of the state of the processor control circuit in non-volatile memory and set the control circuit in a state in which the control circuit can re-start the processor when required.

In a system according to the invention, power input to the control circuit 4 can be conveniently implemented by passive components directly from the primary side of the power source. FIG. 1 shows one possible way of implementing the energy input of the control circuit. In it, the mains voltage is rectified in the rectifier 20, and the rectified mains voltage is taken through high-value resistors 22 to the control circuit. The resistance value of the resistors 22 is preferably high, for example between 1–10 MΩ, whereby the secondary side of the system remains essentially separated from the high-voltage primary side.

FIG. 2 shows one preferred embodiment of the invention in more detail. In the example shown by FIG. 2, the processor control circuit has been implemented in a simple manner by three flip-flops and two transistors. The power input of the control circuit has been implemented by two 4.7 MΩ resistors. A CMOS circuit, for example, can be used as the trigger circuit, whereby the leakage current going through the two 4.7 MΩ resistors is enough to cover the power consumption of the circuit. The capacitor 12 acts as the energy supply, and is recharged through the diode D1 as soon as the power source starts.

It is a prerequisite for the operation of the system according to the invention that there is energy in the energy supply 12. In order to ensure this, a simple timing circuit can be added to the control circuit 14 of the primary side of the power source, which timing circuit starts the power source for a short time when the device is switched to the mains. This period of time can be half a second, for example. Then the energy supply 12 is charged, and the processor 6 can turn the power source off if not otherwise required by the control signals. As implemented in this manner, the system is ready to operate and reacts to the pressing of the power switch, for example, almost immediately after the display is connected to the mains.

It is clear to a person skilled in the art that the above described use of synchronizing signals as control signals is only exemplary, and the control signals can also be implemented in many other ways. Furthermore, the invention is not limited to DPMS systems only, but it can also be applied to other types of display systems.

It is also clear that many kinds of signals connected to the display can be used as the control signals, such as the output signals of a peripheral device coming through a SCART connection i.e. a standard connection which complies with the standards issued by the syndicat des constructeurs d'appareille radio recepteur et televiseur.

In this context, the term display means any device containing a cathode-ray tube, such as a computer display or a television.

In the power saving mode (the OFF mode in a DPMS system), power consumption is extremely low, because the power source and the processor of the display have been switched off. Because the power source and the processor are only started when required, the average power consumption also remains low.

Because the control circuit 4 consumes very little power, the power input of the control circuit can be implemented directly from the primary side by means of low-priced, passive components.

Component costs remain low, because the system according to the invention utilizes a processor which is already in the display, and the utilization of the invention does not require adding an extra processor to the device. A system according to the invention can be implemented by low-power, ordinary components.

I claim:

1. A method for reducing power consumption of a display, in which a processor (6) controls operation of the display on the basis of the state of display control signals (8) and a power switch (10), in which method a display power source (2) and the processor (6) are switched off for reducing power consumption, characterized in that when the display power source (2) and the processor (6) are in a power saving mode, said processor (6) is started when a change in the state of one of said display control signals (8) takes place.

2. A method according to claim 1, characterized in that after starting the processor (6) in which the processor (6) starts the display power source (2), and then the processor (6) examines said display control signals (8) and power switch (10) and then sets itself in a mode based on the display control signals and a state of the power switch (10).

3. A system for reducing the power consumption of a display, in which system a power source (2) of the display is arranged to be switched off for the duration of a power saving mode, and in which system an operation mode of the display is determined on the basis of display control signals (8) and a power switch (10), characterized in that the system comprises a control circuit (4) for monitoring said control signals (8) and power switch (10) in the power saving mode and in that said control circuit (4) is arranged to switch on a system processor (6) when a change in a state of said control signals (8) takes place.

4. A system according to claim 3, characterized in that an operating voltage of said control circuit (4) is coupled by passive components (22) from a primary side of the power source (2).

5. A system according to claim 4, characterized in that said passive components (22) are resistors (22).

6. A system according to claim 3, further comprising means for storing energy needed to start said processor (6).

7. A system according to claim 6, characterized in that the means for storing energy (12) is a capacitor (12).

8. A system according to claim 3, characterized in that the processor (6) is arranged to start the power source (2) of the display for producing energy needed to examine the state of the control signals (8) and the power switch (10).

9. A system according to claim 8, characterized in that the processor (6) is also arranged to examine the state of said control signals (8) and power switch (10) and to turn the display to a mode determined by the power switch.

* * * * *

UNITED STATES PATENT AND TRADEMARK OFFICE

CERTIFICATE OF CORRECTION

PATENT NO. : 5,907,480

DATED : May 25, 1999

INVENTOR(S) : Vesa Ilari Salonen

It is certified that error appears in the above-identified patent and that said Letters Patent is hereby corrected as shown below:

In column 6, line 29 (claim 2, line 2) "in which" should be deleted.

Signed and Sealed this

Fifth Day of October, 1999

Attest:

Q. TODD DICKINSON

*Attesting Officer*

*Acting Commissioner of Patents and Trademarks*